Aug. 20, 1957 R. A. ROBERT ET AL 2,803,168
APPARATUS FOR RELEASING ROCKET-BOMBS FROM AN AIRCRAFT
Filed April 18, 1951 6 Sheets-Sheet 2

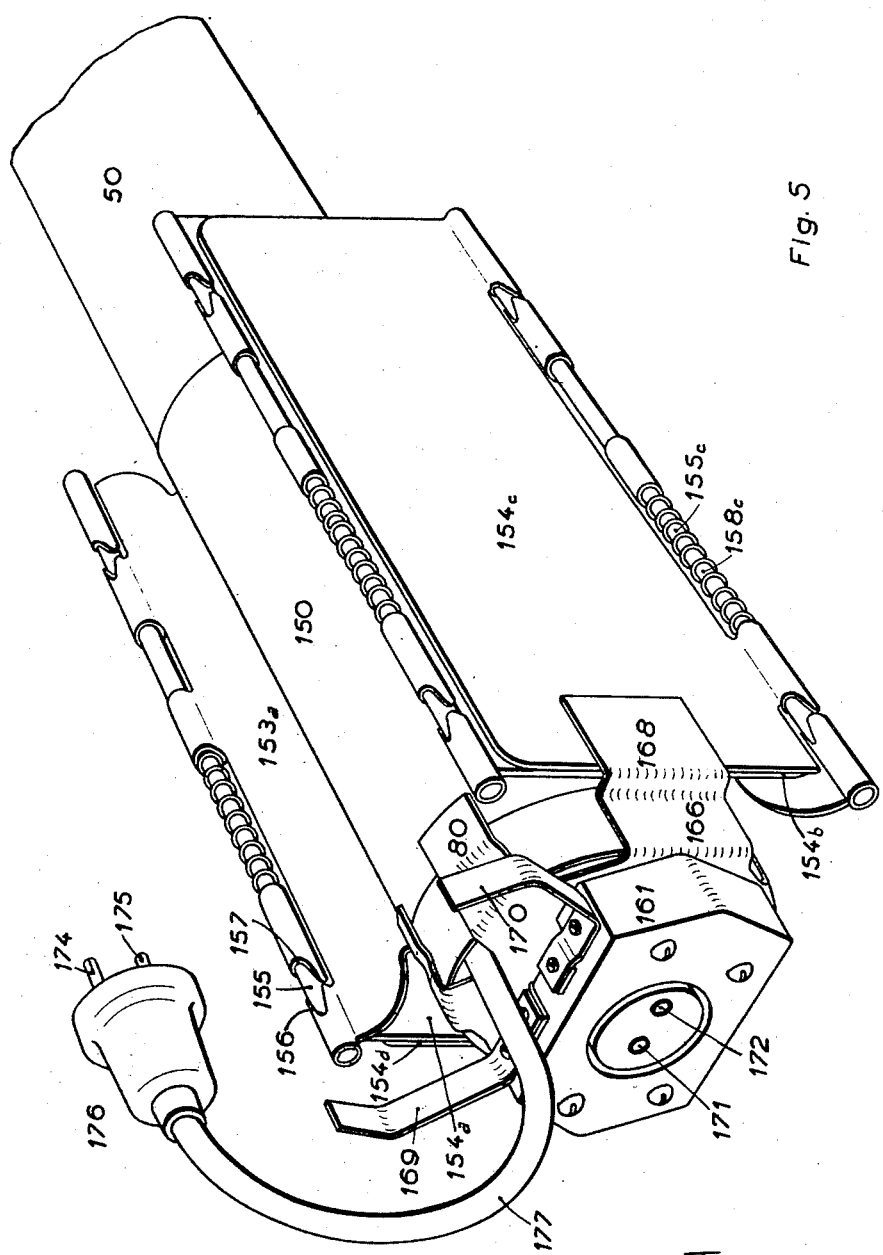

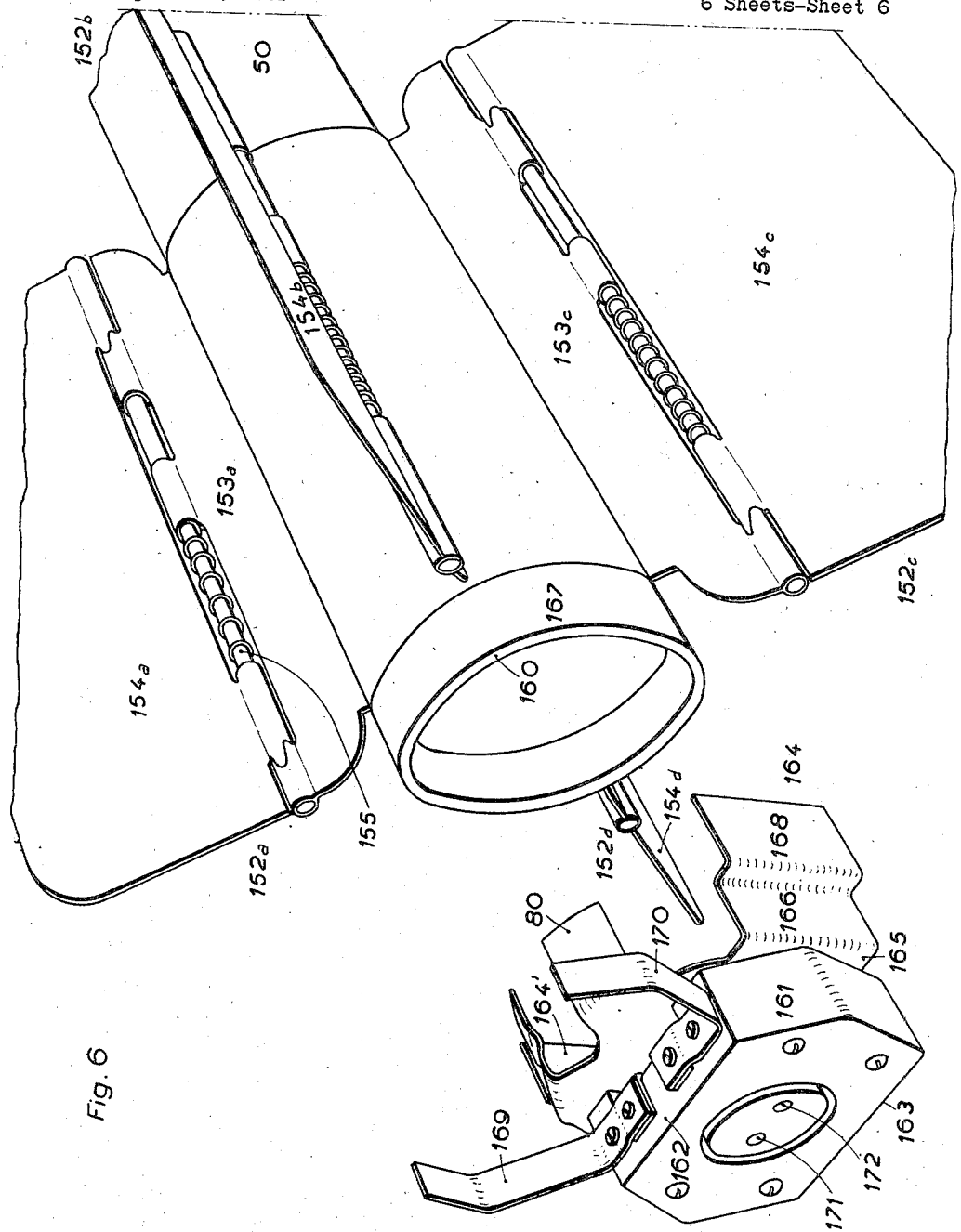

United States Patent Office 2,803,168
Patented Aug. 20, 1957

2,803,168

APPARATUS FOR RELEASING ROCKET-BOMBS FROM AN AIRCRAFT

Roger A. Robert, Boulogne-sur-Seine, and Pierre P. Matge, Aubervilliers, France; said Matge assignor to said Robert Application April 18, 1951, Serial No. 221,546

Claims priority, application France April 20, 1950

7 Claims. (Cl. 89—1.7)

This invention relates to armament equipments for aircraft. It is applicable to aircraft armament equipments comprising one or more vertical rows of rocket-bombs disposed in substantially horizontal superposed relationship, for instance in the fuselage of the aircraft, the row or rows of rocket-bombs being fed towards an aperture provided in the bottom of the fuselage, the lowermost rocket-bomb being released or fired when it emerges from the fuselage body.

An equipment of this type is described in the U. S. patent application Ser. No. 122,888, filed October 22, 1949, now U. S. Patent No. 2,630,740, by same applicants for: "Apparatus for Launching Rocket-Bombs from Aircraft."

In an equipment of this kind the release or firing of a rocket is an extremely delicate problem and anybody conversant with the art knows that the trouble-free operation of the assembly and, therefore, the military degree of excellence of the equipped aircraft depend on its solution.

It is therefore one object of this invention to provide an equipment of this type in which the rocket-bomb having reached its release position is fired in an absolutely certain manner without any possibility of failure or misfire.

It is therefore an object of this invention to provide an aircraft having the maximum firing efficiency.

A still further object of this invention is to provide such an equipment which, while assuring with certainty the firing of a rocket-bomb in release position, is absolutely safe as regards premature firing or the firing of a rocket-bomb short of its release position.

It is therefore an object of this invention to provide an aircraft protected positively from serious and frequently irremediable damages such as caused by the premature firing of a rocket-bomb.

Moreover, an object of this invention is to provide a firing device for aircraft rocket-bombs which, while assuring the above-defined objects simultaneously, can be carried out by utilizing the conventional firing members of rocket-bombs.

It is another object of this invention to provide a device of this kind operating on the electric supply sources normally available for this purpose.

A still further object of the invention is to provide such a device, wherein the release is ensured with the same efficiency and safety even in case of electric losses, irrespective of their sources.

Another object of this invention is to provide a rocket-bomb releasing aircraft fitted with a conventional electrical equipment, releasing conventional or standard rocket-bombs and constructed without any special precautionary measures, whilst having higher qualities than an aircraft releasing known rocket-bombs.

It is another object of this invention to provide an equipment as mentioned hereinabove which is free from aerodynamic drag.

It is therefore another object of this invention to provide an aircraft the flying qualities of which remain unaltered in spite of its powerful armament equipment.

Furthermore, one object of this invention is to provide an equipment the operation of which, on firing a rocket, leaves no residue likely to develop any risk of deterioration.

It is also an object of this invention to provide an armament equipment of this type which is particularly adapted for releasing rocket-bombs having collapsible tail-fins.

Another object of this invention is to provide such an equipment in which the number of parts required is kept to a minimum, certain parts acting both as electrical and mechanical members.

Another object of this invention is to provide an armament equipment wherein, in case rocket-bombs with collapsible tail-fins are used, the latter are maintainied in their folded condition until the rocket-bomb is definitely released.

With this object in view, it is another object of this invention to provide an equipment whereby an aircraft is endowed with a considerable striking or fire power, whilst the rocket-bombs are fed towards their release position through a relatively simple mechanism.

Another object of this invention is to provide an equipment of the type defined above wherein a rocket-bomb, as long as it is connected to the aircraft, will have the minimum emergence from the fuselage and either zero aerodynamic drag or a minimum value thereof.

These objects will best be understood from the following description of one illustrative embodiment of the invention illustrated diagrammatically by way of example in the affixed drawings, wherein:

Fig. 5 is a perspective view of the rear portion of the rocket-bomb in its storage condition;

Fig. 6 is a view similar to Fig. 5 but showing the rocket-bomb just after its release.

Figure 1:
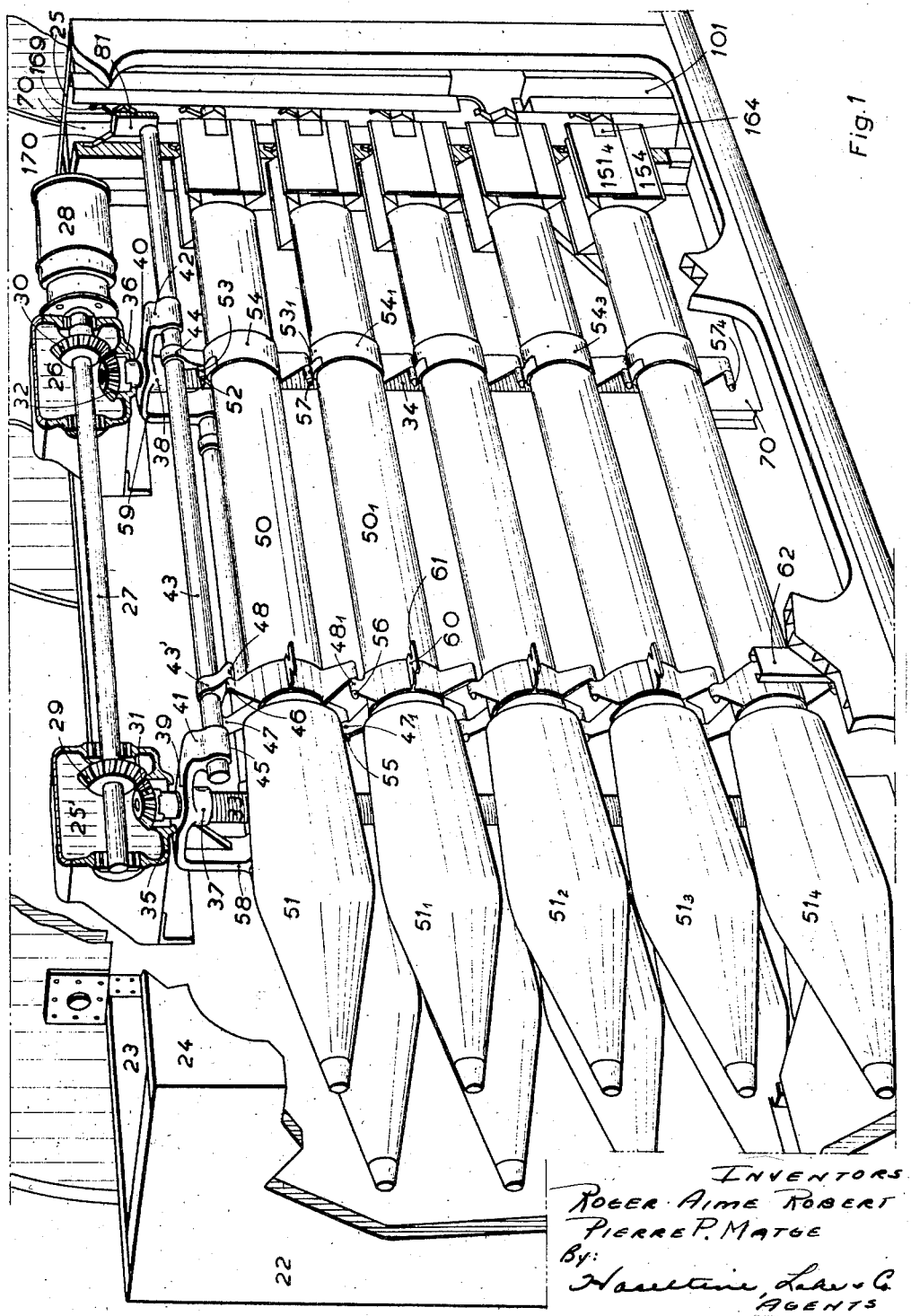
Fig. 1 is a perspective comprehensive view of the equipment according to this invention with parts broken away.

Referring now to the drawings and more particularly to Fig. 1, the fuselage 20 of an aircraft has fixed therein a magazine 21 of generally parallelepipedic shape comprising a front wall 22, side walls 23, 24 and a rear wall 25. One, some or the whole of these walls may be formed with apertures, or latticed. In certain cases this magazine may be dispensed with.

In the fuselage, at the upper portion of the magazine, are fixed a pair of casings 25', 26 arranged to support a shaft 27 shown in a horizontal position in the figure and driven by an electro motor 28. On the shaft 27 are mounted for rotation therewith a pair of bevel pinions 29, 30 located in the casings 25', 26 respectively and in meshing engagement with bevel wheels 31, 32 respectively, mounted on a pair of shafts 33, 34 for rotation therewith, shown in a vertical position in the figure and rotatably supported by the bottom portions 35, 36 of casings 25', 26, means being provided for holding the shafts 33, 34 against axial motion.

Both shafts 33, 34 extend through substantially the entire height of magazine 21. Their portions emerging from casings 25', 26 are screw-threaded and carry cooperating internally screw-threaded sockets 37, 38 respectively, formed integrally with bracket portions 39, 40 respectively. The external arms 41, 42 of these brackets are adapted to support a rod 43 carrying in turn in fixed relationship a front supporting member 43' and a rear supporting member 44. The front supporting member 43' is provided with a pair of longitudinal studs 45, 46 engaging cooperating eyes 47, 48 formed in a front collar 49 encircling the main part 50 of a rocket-bomb 51. The back supporting member 44 is provided with only one longitudinal stud 52 positioned in the diametral plane of symmetry of the aforesaid pair of studs 45, 46 and engaging an eye 53 formed in a back collar 54 also encircling the main part 50 of the rocket-bomb 51. The lower portion of collar 49 carries a pair of studs 55, 56 engaging the eyes $47_1$, $48_1$ of the front collar $49_1$ of the rocket-bomb $51_1$ supported immediately below the rocket-bomb 51; besides, collar 54 carries an additional stud 57 engaging the eye $53_1$ of the rear collar $54_1$ of the rocket-bomb $51_1$. Thus, the rocket-bombs of the row supported by the rod 43 are suspended from one another in parallel relationship and contact or substantially contact one another, so that they occupy a minimum space.

In the embodiment described both brackets 39, 40 are provided with internal arms 58, 59 adapted to support a rear row of rocket-bombs through the medium of parts similar to those described in the preceding paragraph regarding the front row. This is the arrangement described in the aforesaid U. S. patent application Ser. No. 122,888, filed on October 23, 1949, by same applicants.

Each collar 49 carries a plate 60 extending towards the registering wall of the magazine, which for the row under consideration is the wall 24, the external portion 61 of this plate having a rectangular periphery adapted slidably to engage a front slideway 62 fast with the magazine and having a corresponding section, in view of guiding the rocket-bombs during their feeding movements.

Figure 4:
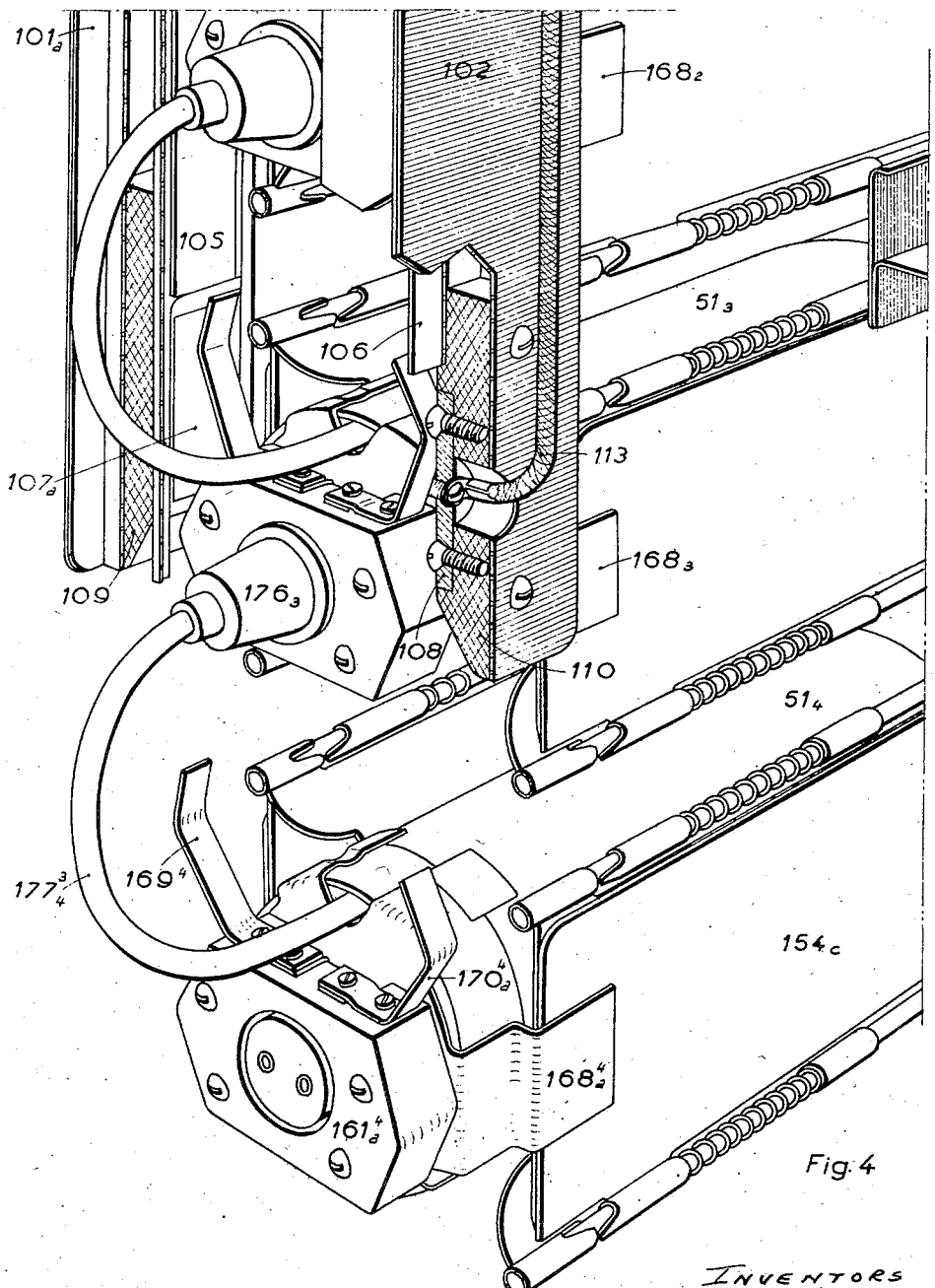
Fig. 4 is a perspective view to a larger scale of the lower portion of the equipment.

At the rear of the inside of the magazine, parallel vertical slideways 101, 102 for one row and 103, 104 for the other row are arranged. The outer slideways 101, 104 are carried by the lateral walls 23, 24 and the inner slideways 102, 103 by a rear partition element 70. Between the slideways of each pair, one row of rocket-bombs is disposed. As the arrangement of one row is identical with that of the other row, the following description will refer to only one arrangement, for the sake of clearness. The guide members or slideways 101, 102 extend practically from top to bottom of the magazine 20 and their inner registering faces are lined with metal facings 105, 106 extending throughout the height of the magazine except for the lower portion thereof. At this lower portion of the magazine both slideways 101, 102 are lined with facings 107, 108 which form the extensions of facings 105, 106 respectively, and are however electrically insulated therefrom. Thus, for instance, facing 107 is spaced apart from facing 105 and facing 108 is spaced apart from facing 106 and are supported by insulator blocks 109, 110 respectively (see Fig. 4), fixed on the slideways 101, 102. Both facings 105 and 106 are electrically interconnected through one or more short conductors, such an upper conductor 111 being illustrated. Thus, these facings are kept in permanent short-circuited condition and in all cases are at the same electric potential. The facing 108 is directly grounded through a wire 112. The facing 107 is connected through a wire 113 to a two-position contact member or armature 114, this contact member engaging either a contact stud 115 grounded directly or a contact stud 116 connected through a wire 117 to one terminal 118 of electric battery 118' the other terminal 119 of which is grounded. The contact member 114 is fixed to the movable member 120 of an electromagnet 121 the energizing coil 122 of which has one end 124 grounded and its other end connected through a wire 125 with the aforesaid battery terminal 118, a firing switch 126 and a trigger 127 being interposed in the circuit from battery to coil.

The electrical arrangement of the other pair of slideways 103, 104 of the other row is similar to that described above. It is carried out by merely connecting the lower conductive surfaces 107a, 108a to wires 112 and 113 respectively, the upper conductive facings of slideways 103 and 104 being in permanent short-circuited condition through wires such as 111a. A circuit 130 from wire 125 is provided for supplying electric current and therefore controlling the electro-motor 28.

Each rocket-bomb 51 is formed at the rear, on its nozzle 150 (see Figs. 5 and 6) with a fin-unit 151 the vanes 152 of which consist each of a fixed portion 153 fast with the nozzle 150 and a movable portion 154 hingedly mounted on the fixed position 153 through a pin 155. Slope faces 156, 157 are provided on the fixed and movable portions respectively in view of permitting the locking of the vane in its spread position in the fashion on a bayonet fixing. A spring 158 constantly urges the movable portion towards its spread position and the registering slope faces 156, 157 against each other. According to this invention the vanes are held in their folded condition by utilizing the same device as that provided for firing the rocket-bombs. This device caps a rear portion 160 of the rocket-bomb and comprises a casing 161, for instance of hexagonal shape in the example illustrated, formed with an upper face 162 and a lower face 163 and containing the firing member proper. On this casing 161 are fixed angle lugs 164 of which one portion 165 serves the purpose of securing the lug on the casing 161, another portion 166 around the rear end 167 of the rocket-bomb, while an external end portion 168 is more distant from the axis common to the rocket-bomb and to the aforesaid device than said lug portion 166. As clearly illustrated in the drawing, this lug portion 168 maintains the movable portion 154 of the vane in its folded position.

In the embodiment illustrated the rocket-bomb is provided with a fin-unit consisting of four vanes 152a, 152b, 152c, 152d. The component parts of each vane are designated with corresponding reference indices. A pair of diametrally opposite lugs 164, 164' are thus sufficient for holding four vanes, the movable portions of two adjacent vanes being joined side by side in their folded position, portion 154a against portion 154d and portion 154b against portion 154c, as indicated in Fig. 5. Fingers 80 extending from portion 165 act as resilient clamping means round the rear portion 167 of the rocket-bomb, the arrangement illustrated comprising four fingers. Preferably, lugs 164 and fingers 80 are formed by suitably cutting and stamping a single plate.

Figure 3:
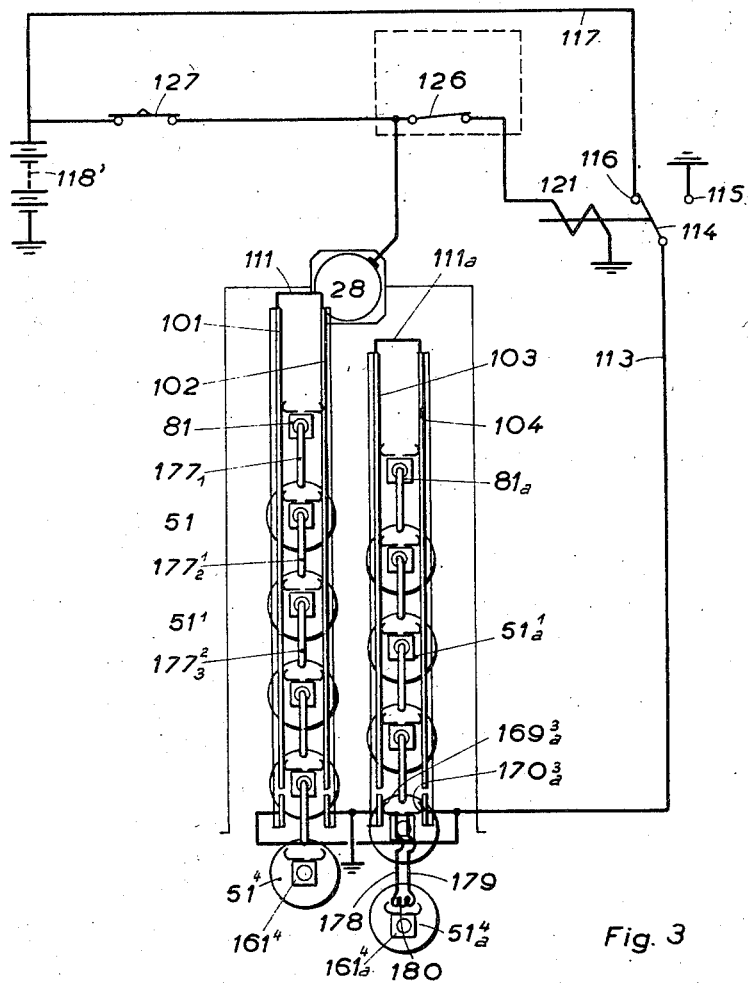
Fig. 3 is a view similar to Fig. 2 but for another condition of the equipment.

On the upper face 162 of casing 161 are fixed a pair of horn-shaped contact blades 169, 170 respectively, in frictional engagement with the aforesaid metal facings 105, 106 and 107, 108 of slideways 101, 102. The casing 161 is formed with a pair of sockets 171, 173 in which a corresponding pair of pins 174, 175 of a connector 176 carried by one end of a cable 177 can be plugged in, the opposite end of the cable issuing from the next rocket-bomb below. The cable 177 comprises two conductors 178, 179 connected to the lead-in terminals of a filament 180 provided for electrically firing the next rocket-bomb below, as shown in Fig. 3. All the rocket-bombs of one row are electrically connected in the same manner. The rear end of rod 43 carries a box or casing 81 provided with friction contact blades 169, 170 and is electrically connected through a cable 177 to the next rocket-bomb below.

Figure 2:
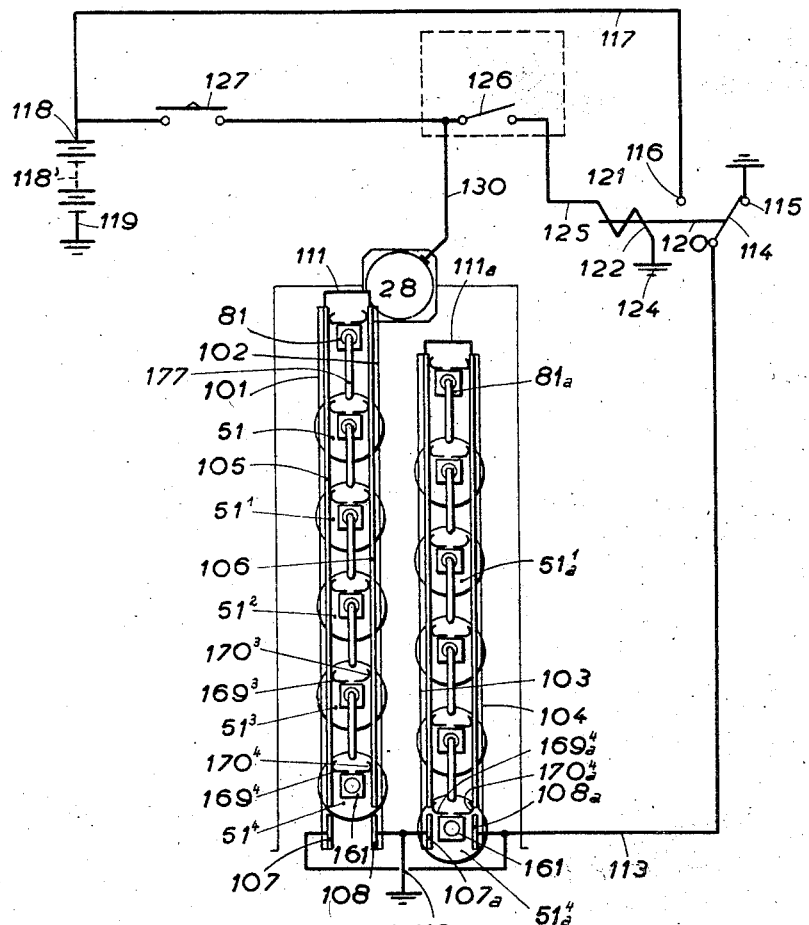
Fig. 2 shows the electric wiring diagram of the equipment.

The equipment described above operates as follows:

In Fig. 2, the equipment is shown in its inoperative position. All the rocket-bombs are enclosed in the magazine. The terminals of all the filaments of the rocket-bombs have exactly the same electric potential because each blade contact 169, 170 cooperates with the relative metal facings 105, 106 which are short-circuited. Thus, no firing can occur even in case of electric losses through the body of the fuselage or other parts of the aircraft.

When it is desired to fire, the switch 126 (Fig. 3) is actuated to its closed position. Besides, on depressing the firing trigger 127 the movable member 114 of the switch is moved from contact stud 115 to contact stud 116 thereby connecting the terminal 118 of the battery 118' with the conductor 113. As a result, a difference in potential is created between surfaces 107 and 108 and also between surfaces 107a and 108a. At the same time, on depressing the trigger 127 the electro-motor 28 is started and, through the mechanical driving means described, both rows of rocket-bombs begin to move towards the release aperture. From the position illustrated in Figure 2 the first rocket-bomb to emerge from the magazine is the lowermost one of the right-hand row. When its contacts $169^4{}_a$ and $170^4{}_a$ engage the relative surfaces 107a, 108a no release part is actuated since the casing $161^4{}_a$ of the firing device of this lowermost rocket has no electric plug. As the downward movement proceeds, the same lowermost rocket $51^4{}_a$ of this row reaches its release or firing position, illustrated in Figure 3. In this position the contact surfaces 107a and 108a are engaged by the pair of contacts $169^3{}_a$, $170^3{}_a$ of the next rocket-bomb above. Then, current flows across the filament 180 and the rocket-bomb $51^4{}_a$ is automatically fired and released. As a consequence of this firing the rocket is projected forward and the reaction force developed thrusts the priming device rearward as illustrated in Fig. 6. The collapsible parts of the rocket vanes are released and the fin-unit, from the position in which its over-all dimensions is a minimum, is automatically spread and locked in its operative position. The cable 177 and the connector plug 176 attached thereto are thrown to the rear together with the casing 161.

Then, the lowermost rocket-bomb $51^4$ of the other row reaches its release position and in this position both sliding contacts $169^3$, $170^3$ of the next rocket above in the same row engage the surfaces 107, 108 and this lowermost rocket in firing position is thus fired in the above-described manner, its tail-fin being spread to its operative position automatically.

Thus, rocket-bombs are fired and released as long as the trigger 127 is depressed, the operation being stopped automatically as soon as the trigger is released.

The safety of the equipment, when the magazine is partially discharged, remains as high as it was in the initial condition. The firing of the upper rocket-bomb of each row is controlled through sliding contacts carried by casings 81, 81a fixed on rods such as 43, and comprising, similarly to casings 161, suitable openings for inserting a connector plug on the end of a wire or cable coming from the upper rocket-bomb of the related row.

The safety factor is also high when the magazine is loaded by introducing rocket-bombs through its bottom aperture and causing the electro-motor 28 to rotate in the direction opposite to the direction of rotation for the release of the rocket-bombs.

What we claim is:

1. In an aircraft having a bottom aperture, a vertical row of rocket-bombs disposed horizontally, means for applying a feeding motion to said row towards said aperture and means for guiding said feeding motion, a pair of parallel slideways arranged on either side of said row, contact members carried by each of said rocket-bombs and in frictional engagement with said slideways, each slideway having a first electrically conductive facing interrupted in the vicinity of said aperture, means for short-circuiting said conductive facings of said slideways, other conductive facings on said slideways in the vicinity of said aperture, said other conductive facings forming the extensions of, and being electrically insulated from, said first conductive facings, means for applying an electrical potential difference between said other conductive facings, and circuit means for selectively causing and interrupting said potential.

2. In a rocket-bomb firing apparatus for aircraft, wherein a plurality of rocket-bombs are supported in superimposed relationship and are fed in succession towards a firing position, each rocket-bomb comprising electric firing means therein, in combination; a pair of current input elements on each rocket-bomb connected to the firing means of the rocket-bomb immediately below it in said plurality, a pair of conductive rails fixed with respect to said aircraft in electrical contact with said input means, means for short-circuiting said rails, the length of said rails being so predetermined that the input means of any one rocket-bomb will cooperate therewith so long as the rocket-bomb immediately below it has not attained firing position, further conductive rail means aligned with but insulated from said first rails and positioned to cooperate with said input means as said lower rocket-bomb has attained its firing position, and means for establishing a voltage across said further rail means.

3. In an aircraft rocket-bomb firing apparatus wherein the rocket-bombs each comprise an electric firing device, said rocket-bombs being supported in horizontally extending superimposed relationship in a vertical file and being fed bodily towards a firing position, in combination; a pair of conductive rails parallel to the direction of feed of said rockets, means for short-circuiting said rails, a pair of current input members on each rocket-bomb and cooperating with said rails, electric connecting means between said input members and said firing device of the rocket-bomb immediately below said first mentioned rocket-bomb in said plurality, further conductive rail elements aligned with said first rails and insulated therefrom, and means maintaining a voltage between said further rail elements, the lengths of said rails being so predetermined that the input members of one rocket-bomb cooperate with said first rails so long as the rocket immediately below said one rocket in said file has not attained its firing position.

4. In an aircraft rocket-bomb release apparatus wherein the rocket-bombs have foldable tail fin elements, are supported in a vertical file and are successively fed towards a firing position, and comprising a firing device in each rocket-bomb, in combination; a cover element resiliently surrounding the rear end of each rocket-bomb and interposed in the path of the propulsion jet of said rocket bomb, a pair of current input members supported on said rocket-bomb, a pair of fixed conductive rails fixed on the aircraft and cooperating with said input members, an electric connecting means between said pair of input members on one said rocket-bomb and the electric firing device of the rocket-bomb immediately below said one rocket-bomb, and stop means on said cover element positioned to cooperate with said folding tail fin elements.

5. In an apparatus for releasing from an aircraft a rocket-bomb comprising electrically operated firing means: means for causing the rocket-bomb to move from a retracted position within the aircraft to an extended firing position, current pick-up means electrically connected to the firing means of the rocket-bomb, a first pair of fixed conducting elements positioned to contact said pick-up means when the rocket-bomb is in retracted position, conducting means electrically short-circuiting the elements of said first pair, a second pair of fixed conducting elements positioned to contact said pick-up means when the rocket-bomb is in extended position, and means for establishing a difference of potential bttween the elements of said second pair.

6. In an apparatus for releasing rocket-bombs: a plurality of rocket-bombs arranged parallel to each other in a vertical stack, means for causing said plurality of rocket-bombs to progress as a unit toward a firing position, a pair of current pick-up elements carried by each rocket-bomb, a first pair of fixed conducting elements positioned to engage frictionally with said pick-up elements, means for short-circuiting the elements of said first pair, a second pair of fixed conducting elements positioned to contact one of said pairs of pick-up elements to supply current to only one rocket-bomb when in said firing position, and means for establishing a difference of potential between the elements of said second pair.

7. In an apparatus for launching rocket-bombs from an aircraft, wherein the rocket-bombs are positioned horizontally in a vertical stack and supported for downward movement in succession toward a launching position outside of the aircraft, the combination which comprises: electrical firing means mounted on each rocket-bomb, current pick-up means on each rocket-bomb, a pair of conductive rails fixed inside the aircraft constructed and arranged to cooperate with the current pick-up means of each rocket-bomb and electrical connecting means between the firing means of each rocket-bomb and the pick-up means of the next overlying rocket-bomb of the stack, the conductive rails being adapted to supply an electrical voltage to the pick-up means of a rocket-bomb with the next underlying rocket-bomb of the stack at said launching position.

References Cited in the file of this patent

UNITED STATES PATENTS

| | | |
|---|---|---|
| 2,313,030 | Tauschek | Mar. 2, 1943 |
| 2,421,752 | Jones | June 10, 1947 |
| 2,440,271 | Hickman | Apr. 27, 1948 |
| 2,444,957 | Skinner | July 13, 1948 |
| 2,458,464 | Busacker et al. | Jan. 4, 1949 |
| 2,458,475 | Lauritsen et al. | Jan. 4, 1949 |
| 2,459,314 | Goodhue | Jan. 18, 1949 |
| 2,465,401 | Skinner | Mar. 29, 1949 |
| 2,468,216 | MacDonald | Apr. 26, 1949 |
| 2,469,350 | Lauritsen | May 10, 1949 |
| 2,485,715 | Eastman | Oct. 25, 1949 |
| 2,503,269 | Hickman | Apr. 11, 1950 |
| 2,591,834 | Kuka | Apr. 8, 1952 |

FOREIGN PATENTS

| | | |
|---|---|---|
| 632,599 | Great Britain | Nov. 28, 1949 |